(12) United States Patent
Shigemitsu et al.

(10) Patent No.: US 12,050,360 B1
(45) Date of Patent: Jul. 30, 2024

(54) INDUCTION HEATING ASSEMBLED LENS UNIT

(71) Applicant: Apple Inc., Cupertino, CA (US)

(72) Inventors: Norimichi Shigemitsu, Yokohama (JP); Misha Scepanovic, San Jose, CA (US); Steven Webster, Singapore (SG)

(73) Assignee: Apple Inc., Cupertino, CA (US)

( * ) Notice: Subject to any disclaimer, the term of this patent is extended or adjusted under 35 U.S.C. 154(b) by 500 days.

(21) Appl. No.: 17/480,039

(22) Filed: Sep. 20, 2021

Related U.S. Application Data

(60) Provisional application No. 63/083,024, filed on Sep. 24, 2020.

(51) Int. Cl.
| | |
|---|---|
| *G02B 7/02* | (2021.01) |
| *B29C 65/02* | (2006.01) |
| *G02B 1/04* | (2006.01) |
| *G02B 5/00* | (2006.01) |
| *G02B 13/00* | (2006.01) |
| *B29C 65/00* | (2006.01) |
| *B29D 11/00* | (2006.01) |
| *B29K 701/12* | (2006.01) |
| *G02B 27/00* | (2006.01) |

(52) U.S. Cl.
CPC .............. *G02B 7/021* (2013.01); *B29C 65/02* (2013.01); *G02B 1/041* (2013.01); *G02B 13/001* (2013.01); *B29C 65/002* (2013.01); *B29D 11/00403* (2013.01); *B29K 2701/12* (2013.01); *G02B 5/003* (2013.01); *G02B 5/005* (2013.01); *G02B 27/0018* (2013.01)

(58) Field of Classification Search
None
See application file for complete search history.

(56) References Cited

U.S. PATENT DOCUMENTS

| | | | |
|---|---|---|---|
| 6,157,012 A | 12/2000 | Tanaka et al. | |
| 2006/0291076 A1* | 12/2006 | Watanabe | G02B 7/026 359/811 |
| 2012/0182629 A1 | 7/2012 | Seo | |

* cited by examiner

*Primary Examiner* — Derek S. Chapel
(74) *Attorney, Agent, or Firm* — Robert C. Kowert; Kowert, Hood, Munyon, Rankin & Goetzel, P.C.

(57) ABSTRACT

A lens assembly includes a stack of thermoplastic lenses that are aligned along a common optical axis and that are interleaved with metallic disks having an open central portion. Peripheral portions of each of the thermoplastic lenses adhere to the interleaved metallic disks to form a fused stack of lenses. A method of making the fused stack of lenses is disclosed and includes subjecting a set of interleaved lenses and metallic disks to an alternating current electromagnetic field that induces eddy currents in the metallic disks, causing heating that melts the adjacent lenses. The melted thermoplastic lens material adheres to adjacent metallic disks. The metallic disks reduce stray light from entering the lens stack, while permitting light to enter central portions of the lenses.

20 Claims, 9 Drawing Sheets

INDUCTION HEATING ASSEMBLED LENS UNIT

This application claims benefit of priority to U.S. Provisional Application Ser. No. 63/083,024, entitled "Induction Heating Assembled Lens Unit," filed Sep. 24, 2020, and which is hereby incorporated herein by reference in its entirety.

BACKGROUND

Technical Field

This disclosure relates generally to optical systems, and more specifically to magnification in small form factor cameras and lens systems.

Description of the Related Art

The advent of small, mobile multipurpose devices such as smartphones and tablet or pad devices has resulted in a need for high-resolution, small form factor cameras that are lightweight, compact, and capable of capturing high resolution, high quality images at low F-numbers for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens systems with improved imaging quality performance has increased. Thus, a challenge from an optical system design point of view is to provide an imaging lens system that is capable of capturing high brightness, high resolution images, under the physical constraints imposed by small form factor cameras.

SUMMARY

Embodiments include an assembled stack of optical lenses that are immobilized with respect to one another. The lenses are interleaved with metallic disks, with each disk having an open central portion that permits incident light to pass through the open portion of the disk and subsequently enter a center portion of a subsequent one of the plurality of stacked lenses. Respective melted peripheral portions of each lens are attached to one or more corresponding interleaved metal disks, and the lenses form a fused lens stack. A corresponding central portion of each lens is configured to refract light entering the lens.

Embodiments further include a camera that includes a fused lens stack that refracts light entering the camera.

Embodiments further include methods of making a fused lens stack. A plurality of lenses, interleaved with metallic disks, is subjected to a varying electromagnetic field that results in eddy current heating of the metallic disks, and subsequent heating and melting of adjacent thermoplastic lenses at their corresponding peripheral portions. The melted thermoplastic lens material adheres to the respective adjacent interleaved metallic disk(s), resulting in a fused lens stack.

This Summary is intended to provide a brief overview of some of the subject matter described in this document.

Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
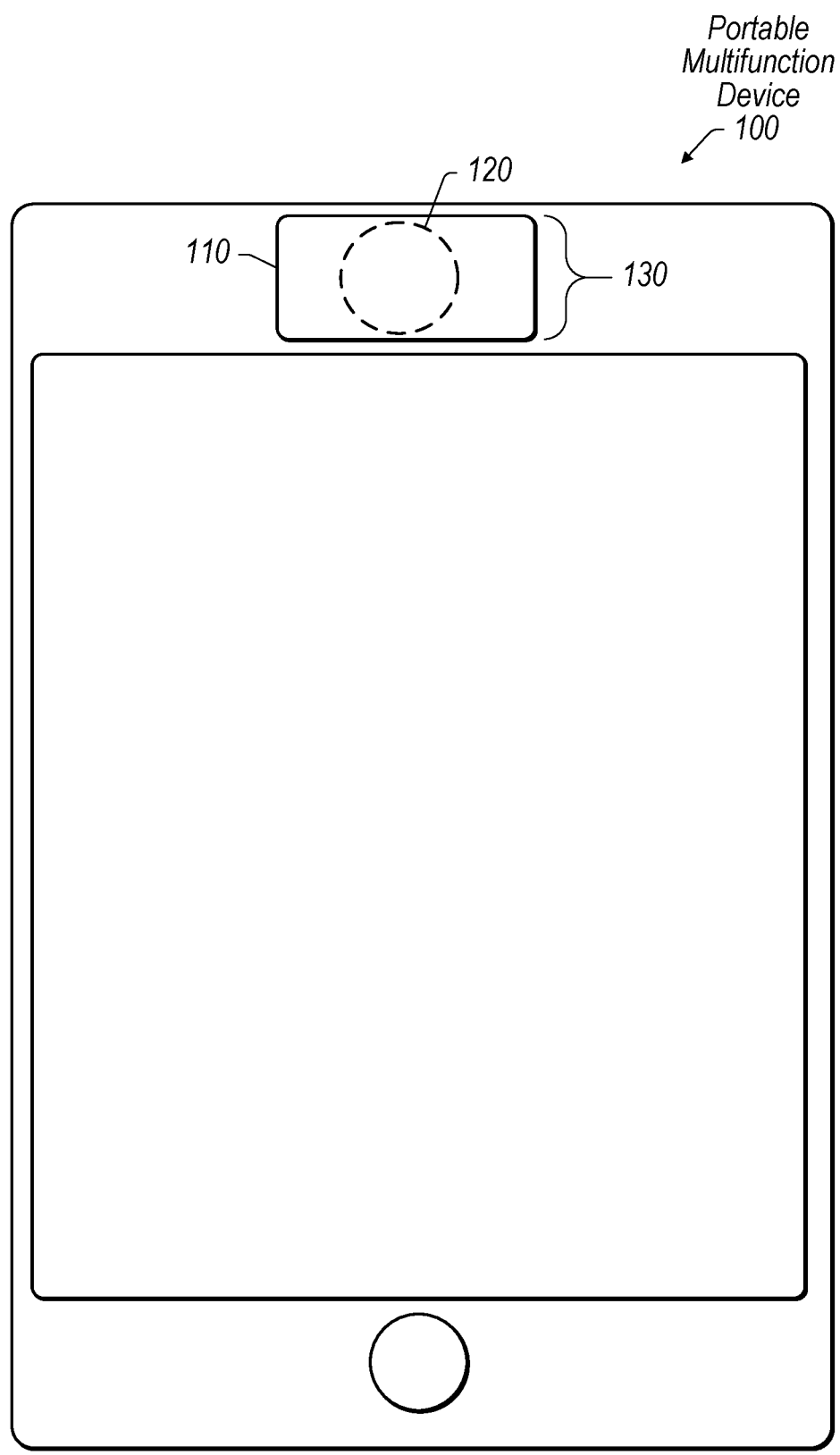
FIG. 1 illustrates a portable multifunction device that includes an optical system.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, optical sensor, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not being electrically powered). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., a field programmable gate array (FPGA) or a generalpurpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of lens systems are described that may, for example, be used in small form factor systems, such as a camera within a cellular telephone. In embodiments, a lens system may be formed that does not require an external barrel, e.g., for mechanical support that maintains relative positions of a plurality of lenses. Elimination of the external barrel can reduce an outer diameter of the lens system, which enables the lens system to occupy less "real estate" on the face of a device (e.g., cell phone) in which the lens system is placed as part of a camera within the device, and may also reduce an overall height of the lens system.

In embodiments, a fused lens stack is made by placing thermoplastic lenses, interleaved with metallic disks (also "metallic rings" herein), into a fixture (also "jig" herein). The metallic disks may include an open portion (e.g., the metallic disk may completely, or at least partially, surround a hole, which hole may be any of a plurality of shapes such as circular, polygonal, elliptical, oval, or another shape), and are in physical contact with radially peripheral portions of corresponding lens(es), e.g., at a peripheral (outer) portion of a radius of a lens. In embodiments, the metallic disks are shaped so as to avoid physical contact with central (e.g., center) portions of the lenses. Avoidance of physical contact with the central portions of the lenses minimizes possible distortion of the central portion of one or more lenses, due to heat conduction from a metallic disk that is heated, e.g., by induction heating, in order to fuse the lens stack. The fixture, within which the interleaved lenses and metallic disks are placed, maintains relative positions of the lenses and the metallic disks with respect to one another prior to induction heating. After loading the jig with the lenses and metallic disks, the loaded jig is subjected to an alternating current electromagnetic field. The electromagnetic field causes eddy current induction heating of each of the metallic disks, and the heat generated causes melting of the peripheral portions of the adjacent lenses that are in physical contact with the corresponding disk, which results in adhesion of the melted peripheral portions of each lens to the adjacent metallic disk. The amount of heat to be generated is such that there is substantially no resulting adverse effect on optical properties of an interior portion (e.g., central portion) of each of the lenses, so that after the lens stack is fused into an unarticulated fused lens stack, the individual lenses continue to refract light with the same optical properties that each lens exhibited prior to the lens stack being subjected to the electromagnetic field.

In embodiments, the electromagnetic field has a predetermined field strength and a predetermined frequency, and the fixture may be subjected to the electromagnetic field for a predetermined amount of time. One or more of the field strength, frequency or amount of time may be determined based in part upon properties of the disks including electrical and electromagnetic properties (e.g., electrical conductivity, magnetic permeability, etc.), thermal conduction properties of the disks, and/or other material properties of the disks. For example, one or more of the electromagnetic field strength, the frequency of the electromagnetic field, or the period of time during which the stack of lenses and disks are subjected to the electromagnetic field, may be selected based on a steady state or instantaneous temperature reached by one or more of the disks and thermal conduction properties of the disks, and may also be selected based in part upon a melting temperature and/or thermal conduction properties of the thermoplastic lenses.

Fusion of the lenses by means of induction heating of the metallic disks interleaved with the lenses may maintain localization of the heating of adjacent lenses at peripheral portions of the lenses, so that a central portion of each lens is not deformed due to the inductive heating of the metallic disks. Thus, the lenses of the lens stack may be fused without adversely affecting optical properties (e.g., refraction of light) for the central portions of the lenses. Because no melting or adverse distortion of the central portions of corresponding lenses occurs due to induction heating of the metallic disks, the optical properties of the central portions of the lenses, including refractive properties, are essentially unchanged (e.g., not adversely affected) after the heating and consequent adhesion of the lenses to one or more corresponding metallic disks, as compared with the optical properties of the central portions of the lenses prior to the heating and adhesion of the lenses to the corresponding metallic disk(s).

The metallic disks may serve an additional function after the fusing is complete: one or more of the metallic disks may block some extraneous light from entering the lenses (e.g., entering at peripheral portions of the lens stack along skewed directions). Blocking unwanted extraneous light from entering the lens stack may result in improved (e.g. sharpened) image formation and improved contrast, e.g., when used in a camera such as a camera within a cellular telephone. In embodiments, some or all of the metallic disks may be coated (e.g., blackened) to reduce reflectivity of light that might otherwise enter the lens stack, e.g., at a skewed angle with respect to the common optical axis of the lens stack.

A fused lens stack, as described in various embodiments herein, may exhibit improved reliability, e.g., with regard to an unexpected impact to the lens combination, such as an accidental drop or impact with a hard surface, in comparison with other arrangements that immobilize a set of lenses with respect to one another. For example, an arrangement, such as will be discussed with regard to FIG. 2A, features a plurality of lenses immobilized within a housing ("lens barrel"), including use of a retainer ring. If a camera containing the lens barrel were to be accidentally dropped onto pavement or impacted against another hard object, the resulting impact could jar the retainer ring to "pop out" of its intended position. As a result, the lenses could fall out of the lens barrel and could break, or become scratched.

In contrast, for the immobilized ("fused") lens stack described herein in various embodiments (e.g., FIG. 2B), the plurality of lenses are immobilized with respect to one another by attachment, to interleaved disks, of successive lenses made of one or more thermoplastic materials (e.g., made using the induction heating techniques described herein), without use of a retainer ring or lens barrel. A physical impact, with a hard surface, of the fused stack of lenses may be less likely to result in separation of the lenses than a physical impact with a hard surface, of the lens stack of FIG. 2A. A fused lens stack made according to embodiments described herein, may be installed in, e.g., a cellular telephone, with smaller chance that an impact to the cellular telephone would destroy the lens stack, than with a lens stack held together mechanically, such as the lens stack of FIG. 2A.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, methods, procedures, components, circuits, and networks have not been described in detail so as not to unnecessarily obscure aspects of the embodiments.

FIG. 1 illustrates a portable multifunction device 100, according to some embodiments. Device 100 may be, e.g., a cellular telephone, tablet, mobile multifunction device, or other mobile electronic device. On a front face of the device 100, a notch 110 having a notch height 130 permits light to enter a camera module 120 located internally to the device 100. The camera 120 has an entrance diameter less than or equal to the notch height 130. From a point of view of use of surface area ("real estate") on the face of the device 100, it may be advantageous for the notch 110 to be as small as possible, while permitting the camera module 120 to function as intended. The size of the notch 110 including the notch height 130 may be at least partially dictated by the size of the camera module 120. Reducing the size of the camera module 120 may allow the size of the notch 110, including the notch height 130, to be decreased. Embodiments described herein for a fused lens stack may allow for a smaller diameter lens stack, which may in turn permit a decrease in the size of the camera module 120 that includes the lens stack, which consequently may allow for a smaller notch 110 on the front face of the device 100 than, e.g., a lens stack within a lens barrel.

Figures 2A, 2B:
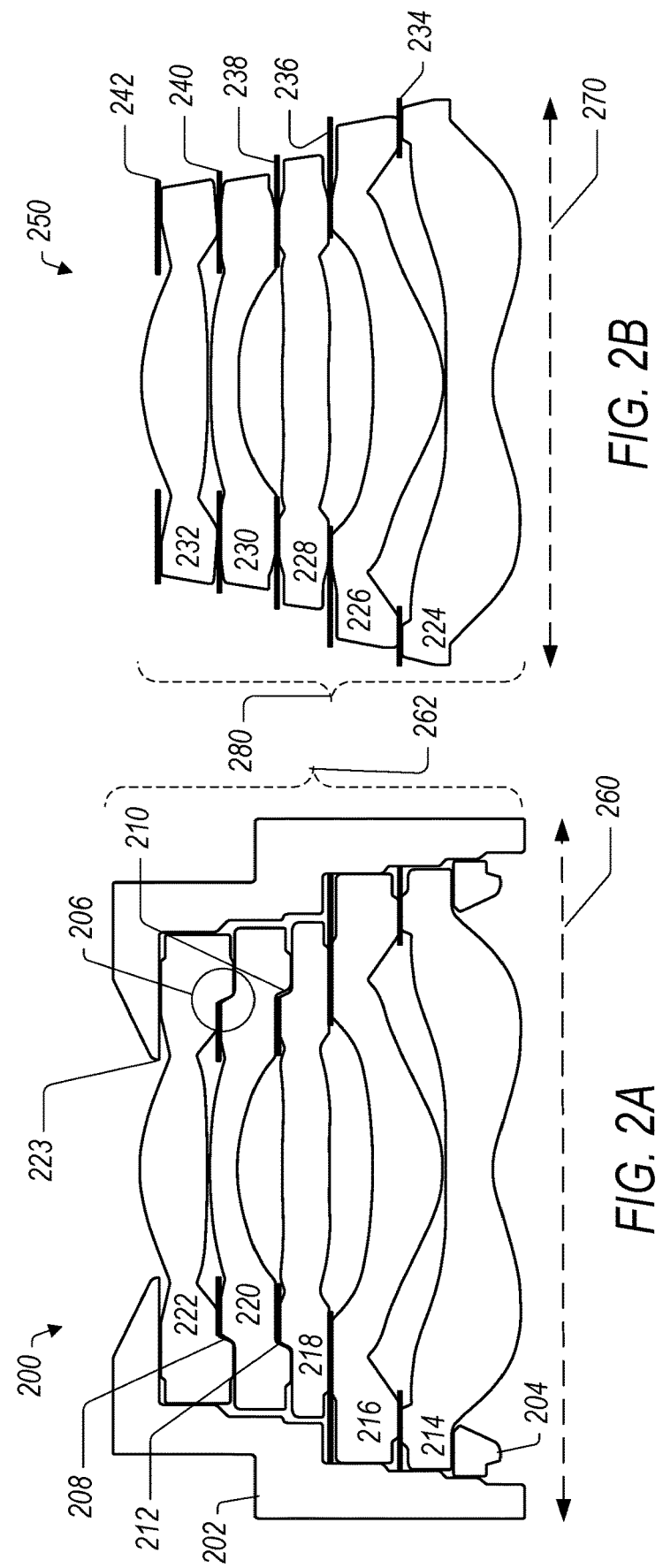
FIGS. 2A and 2B provide a side-by-side illustration including an arrangement of immobilized lenses (FIG. 2A), and an arrangement of fused lenses (FIG. 2B) according to an embodiment.

FIG. 2A illustrates a set of lenses 214, 216, 218, 220, 222 assembled according to one methodology. The set of lenses are maintained within a lens barrel 202 using a retainer ring 204, which may be, e.g., spring-loaded or compression fit to maintain its position relative to the lens barrel 202, or may snap into a groove of the lens barrel, 202, or placed via another technique to substantially immobilize the retainer ring 204 within the lens barrel 202 and hold the lenses in place. Each of the lenses, or only some of the lenses, may be attached to one another via use of interlocking structures. For example, in FIG. 2A interlocking structure 206 (circled to highlight and indicate location of the interlocking structure) and interlocking structure 208 are between adjacent lenses 220 and 222, and interlocking structures 210, 212 are between adjacent lenses 220 and 218. In some embodiments (not shown), there may be interlocking structures between each adjacent pair of lenses. The interlocking structures used to immobilize adjacent lenses with respect to each other (e.g., mating portions of adjacent lenses, or other adjacent interlocking structures) add material to a peripheral portion of each lens that is to be interlocked with an adjacent lens. Therefore an overall size (e.g., diameter) of each interlocking lens would be larger than without inclusion of the interlocking structure, which in turn would increase an overall size of the assembly in comparison to a lens stack without interlocking structures.

The lens barrel 202 serves to maintain relative positions of the lenses 214, 216, 218, 220, 222. The lens barrel 202 adds to the overall size (e.g., diameter and height) and mass of the assembly. If an assembly such as 200 is utilized in a camera assembly such as the camera assembly 120 of FIG. 1, the notch 110 would need to be large enough to accommodate the outer dimensions of the lens barrel 202, e.g. diameter 260, and the thickness of the device 100 would need to be large enough to accommodate the height 262 of the lens barrel 202.

FIG. 2B illustrates an embodiment in which lenses 224, 226, 228, 230, and 232 are stacked and interleaved with metallic disks 234, 236, 238, 240, and also including disk 242 that is optionally metallic. The metallic disks may be fabricated from any of various metals that produce eddy current heating when subjected to an electromagnetic field (e.g., aluminum, stainless steel, SAS, other ferromagnetic metals, etc.). The metallic disks may be circular, polygonal, elliptical, oval, etc. in general shape, and have an open center region, permitting light to pass through the center region (e.g., "donut-shaped" or substantially donut-shaped). The metallic disks are substantially opaque. In some embodiments, one or more of the metallic disks 234, 236, 238, 240, and 242 have one or more openings (e.g., gaps, slits) in body of the disk that serve a thermal stress reduction function, which is illustrated in FIG. 3. In embodiments, one or more of the metallic disks 234, 236, 238, 240, and 242 are darkened, such as coated or painted with a dark (e.g., black), or otherwise opaque material. The opaque regions may prevent some light (e.g., stray light having a substantial angle of incidence with respect to an optical axis of the coaxial lenses) incident on the metallic disk from passing through to peripheral regions of a subsequent lens within the set of lenses, without blocking light entering a central portion of the metallic disk (e.g., entering at a small angle to the optical axis) and subsequently continuing through to enter a central portion of any of the lenses.

In contrast to the arrangement of lenses depicted in FIG. 2A that includes lens barrel 202, the lens stack of FIG. 2B does not have a lens barrel. As indicated above, the lens barrel 202 of FIG. 2A adds to an overall diameter 260 of the lens arrangement 200, and may add to an overall height 262 of the arrangement 200. In further contrast to the arrangement of lenses illustrated in FIG. 2A, the lens stack of FIG. 2B has no interlocking structures (e.g., 206, 208, 210, 212 of FIG. 2A) between several of the lenses. The lens stack of FIG. 2B does not use, or need a lens barrel or interlocking structure(s) that serve to immobilize the lenses with respect to each other. Instead, the lenses of FIG. 2B are fused to one another, and do not need a lens barrel to immobilize the lenses with respect to one another. Further, because the lenses of FIG. 2B are affixed to one another due to melting and fusing of an outer portion of the lenses, there is no need for interlocking structures such as 206, 208, 210, 212 in FIG. 2A, which interlocking structures serve to immobilize adjacent lenses with respect to one another.

Figure 4:
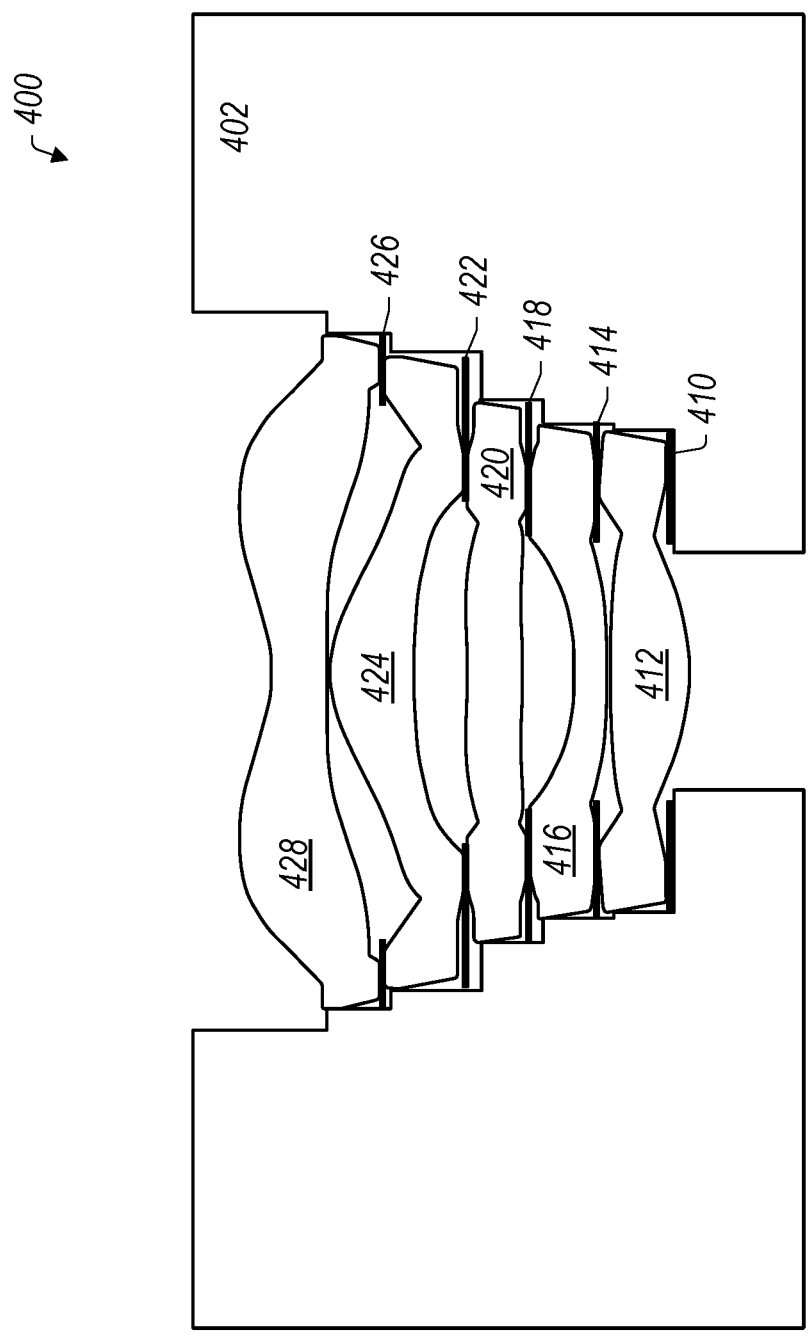
FIG. 4 depicts an arrangement of lenses interleaved with metallic disks within a fixture, according to an embodiment.
Figure 5:
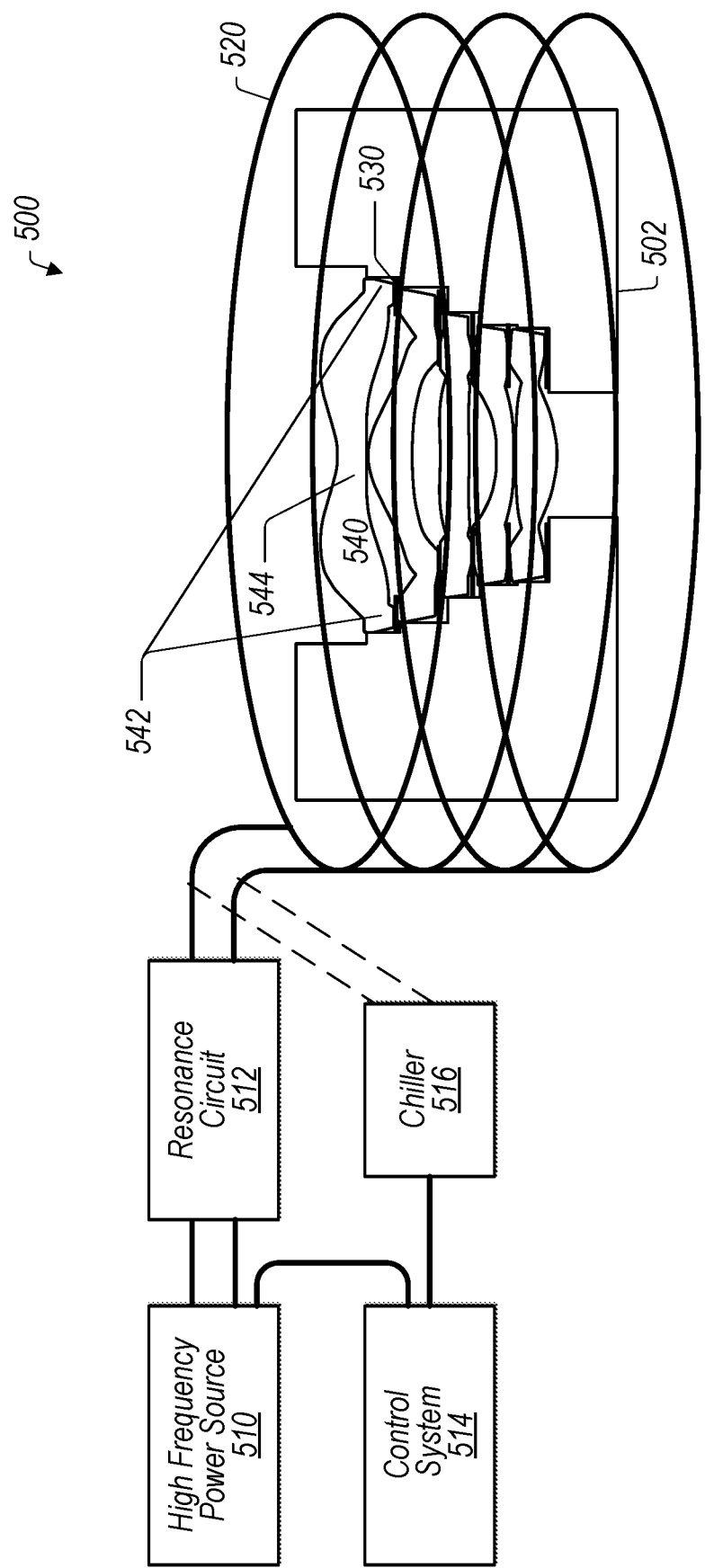
FIG. 5 is an illustration of an apparatus that provides an electromagnetic field for use in forming a fused lens stack, according to embodiments described herein.
Figure 6:
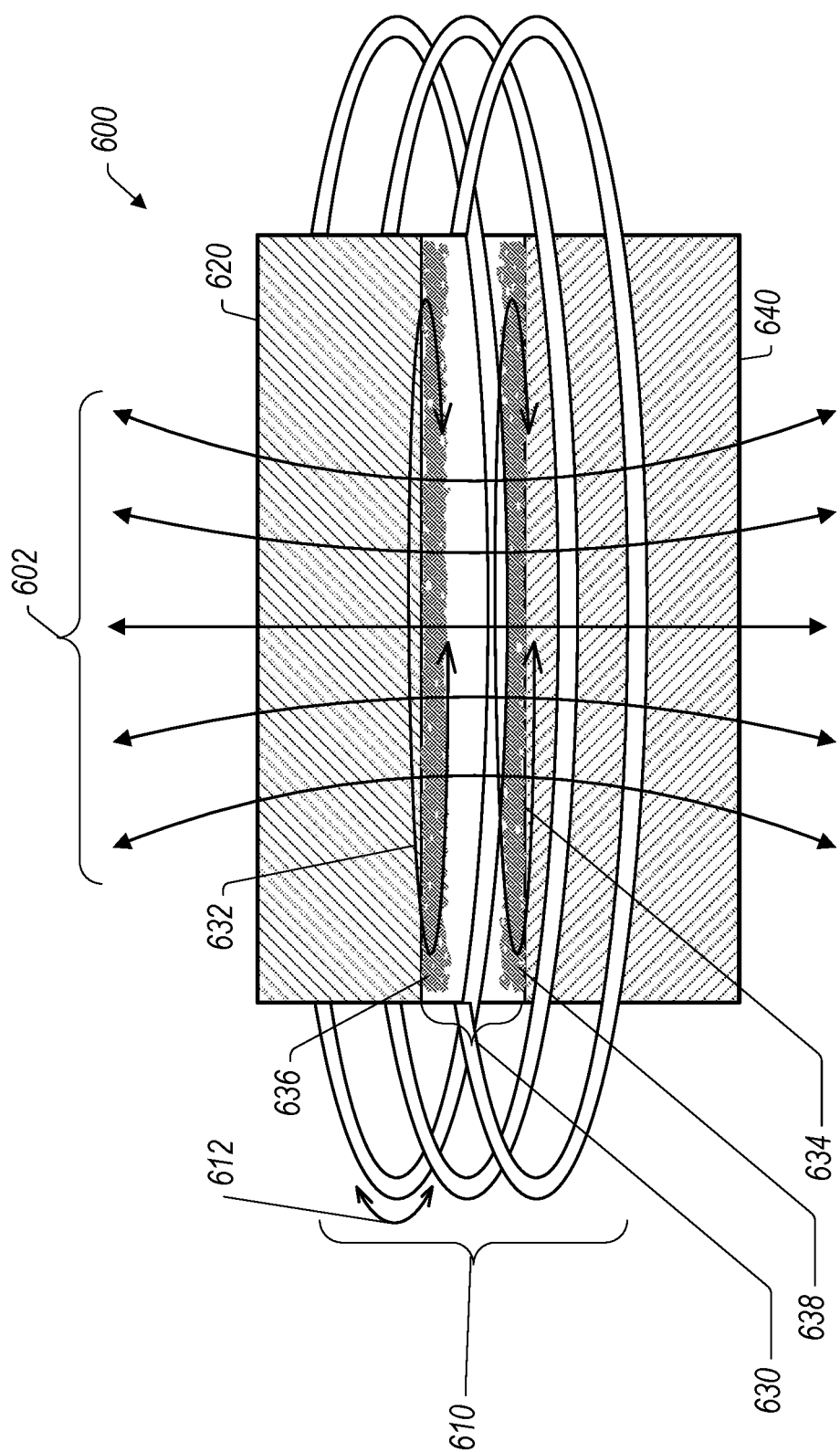
FIG. 6 illustrates a portion of a lens stack subjected to an electromagnetic field produced by an electrically conducting coil, which is used to make a fused lens stack, according to embodiments described herein.
Figure 7:
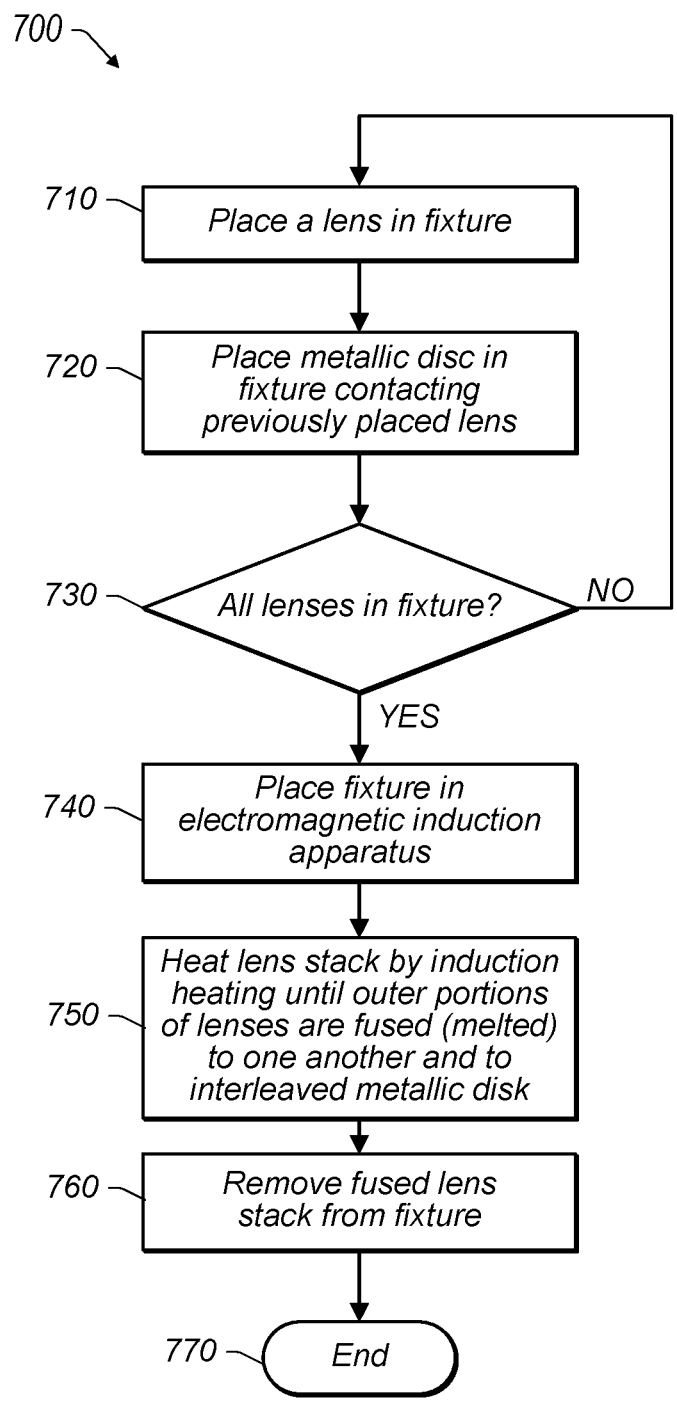
FIG. 7 is a flowchart of a method of making a fused lens stack, according to embodiments described herein.

In contrast to the lens arrangement 200 depicted in FIG. 2A, in FIG. 2B each lens of the lens stack 250 is fused by induction heating of the metallic disks, described in detail herein with regard to FIGS. 5-7. An inductively heated metallic disk causes melting of adjacent thermoplastic lens(es) in physical contact with the heated metallic disk, and the melted thermoplastic adheres to the metallic disk (for interior lenses, on each side to a respective metallic disk). In embodiments, one or more of the lenses may be fused on at least one side to an adjacent lens, or each of the sides (e.g., interior lenses) may be fused to a respective adjacent lens, e.g., the thermoplastic lens material may flow around (or through thermal expansion gaps in the metallic disks) and become attached to the adjacent lens. Thus, the lenses of lens stack 250 are maintained fixed in position with respect to each other via melted thermoplastic as a result of an induction heating process described in detail in FIGS. 4-7. In embodiments, disk 242 may be metallic or non-metallic. Disk 242 may serve as an aperture to the lens stack of FIG. 2B that limits incoming light. In embodiments, disk 242 serves as an aperture to the lens stack of FIG. 2B. In comparison, the lens barrel 202 of FIG. 2A forms aperture 223 that limits incoming light to the lens stack of FIG. 2A, and the aperture 223 of the lens barrel 202 may occupy more space than, e.g., disk 242 used as an aperture in FIG. 2B.

The fused lens stack 250 depicted in FIG. 2B does not have a retainer ring, or a lens barrel, or interlocking structures, and therefore an outside diameter 270 may be smaller than an outside diameter 260 of the lens barrel 202. A camera that employs the fused lens stack 250 therefore can function with a smaller notch (e.g., notch 110 of FIG. 1) on a front face of a device (e.g., the device 100 of FIG. 1) than a camera with a lens stack within a lens barrel 202. That is, a notch through which a camera with the fused lens stack 250, receives light, would occupy a smaller footprint on the face of a device than an notch that accommodates a camera with a lens barrel 202. A smaller notch is advantageous in overall design and construction of the device, as it allows for more surface area ("real estate") of the front surface of the device to be utilized for other purposes, e.g., display screen size. In embodiments, the fused lens stack 250 has a height 280 that does not exceed 6 mm, and in embodiments the height 280 may be less than the height of the lens barrel 262 and lens stack of FIG. 2A.

Figure 3C:
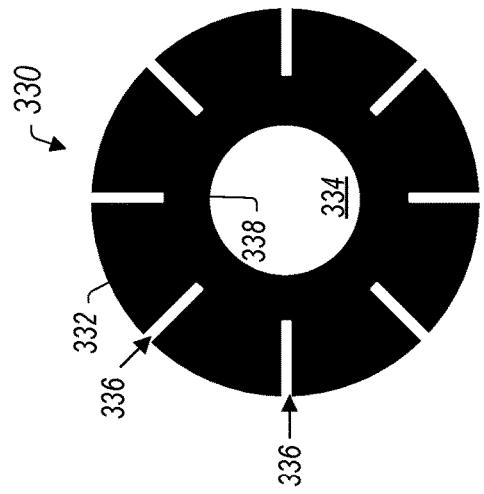
FIGS. 3A, 3B, 3C, 3D, 3E, 3F illustrate various disks and disk portions according to embodiments described herein.
Figure 3F:
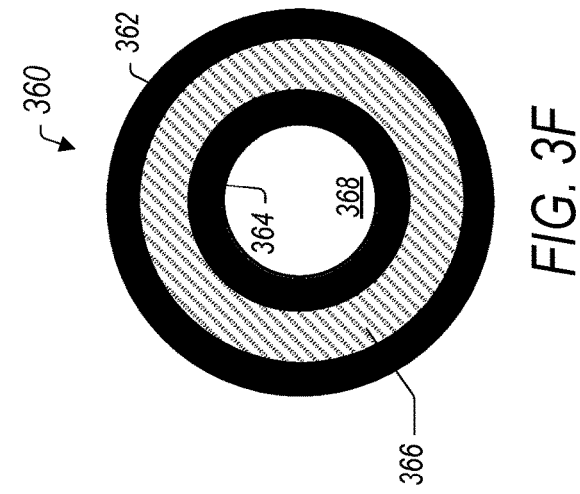
Figure 3B:
Figure 3E:
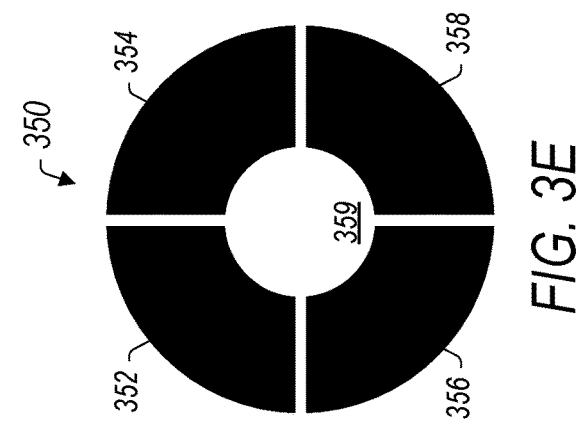
Figure 3A:
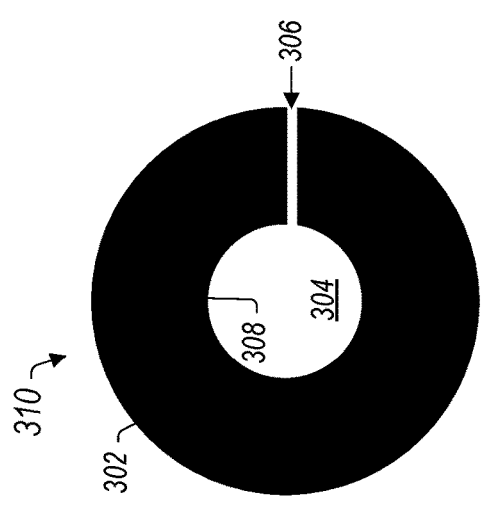

FIG. 3A,B,C,D,E,F illustrate various geometric shapes of disks (also "metal shields,") and portions of disks that may be part of a fused lens stack, such as the fused lens stack illustrated in FIG. 2B. In embodiments, the metallic disks (310, 320, 330) surround or partially surround a respective open center portion (304, 324, 334) that permits light to pass through from one side of the metallic disk to another side of the metallic disk. In embodiments, an exterior boundary (302, 322, 332) of each respective metallic disk (310, 320, 330) may be circular or non-circular, e.g., circular, polygonal (e.g., square, hexagonal, octagonal, etc.), elliptical, oval-shaped, or another shape, and a respective interior boundary (308, 328, 338) of the respective open center (308, 328, 338) of the metallic disk may be shaped as a circle, polygon (e.g., square, hexagon, octagon, etc.), ellipse, oval, or another shape. In embodiments, the disks have a thickness between 20-50 microns; however, in other embodiments, metallic disks may be employed with thicknesses that are less than 20 microns, or greater than 50 microns. In an embodiment, metallic disks in an assembly of stacked lenses (e.g., FIG. 4, 400) have a same thickness. In other embodiments, the thicknesses of various ones of the metallic disks may differ from one another. Metallic disk 310 has a gap 306. Metallic disks 320, 330 have one or more slits (e.g., 326, 336) that may provide thermal stress relief, e.g., the gap or slits may permit the metallic disks to expand or contract during induction heating without causing long-term (e.g., permanent or otherwise of long duration) physical deformation of the metallic disks. As shown, metallic disk 320 has 8 slits notched from the interior portion 324, and metallic disk 330 has 8 slits notched from the outer periphery 332. In other embodiments the slits may have a different shape, e.g., arc-shaped, or other shapes. In other embodiments, one or more of the metallic disks are shaped as solid disks without gap or slits, and with an open center portion (e.g., donut-shaped).

Figure 3D:
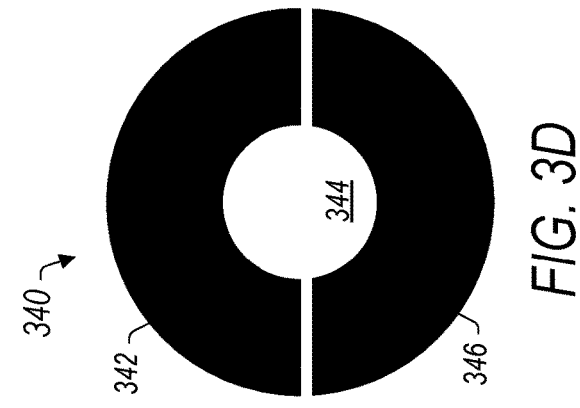

FIG. 3D depicts an embodiment 340 that includes two metallic portions 342, 346. An open interior portion 344 permits incident light to pass through from one side of the embodiment to another side of the embodiment. The embodiment 340 may be used, e.g., in the assembly of FIG. 4 (described below), replacing one or more of the disks 410, 414, 418, 422, 426 that, when subjected to a varying electromagnetic field, experiences eddy current induction heating in the portions 342, 346 that can melt thermoplastic material (e.g., thermoplastic lens(es) or another interleaved plastic layer) in physical contact with a portion of the embodiment 340.

FIG. 3E depicts an embodiment 350 that includes four metallic portions 352, 354, 356, 358. An open interior portion 359 permits incident light to pass through from one side of the embodiment to another side of the embodiment. The embodiment 350 may be used, e.g., in the assembly of FIG. 4 (described below), replacing one or more of the disks 410, 414, 418, 422, 426 that, when subjected to a varying electromagnetic field, experiences eddy current induction heating in the portions 352, 354, 356, 358 that can melt thermoplastic material (e.g., thermoplastic lens(es) or another interleaved plastic layer) in physical contact with a portion of the embodiment 350. Other embodiments are contemplated with more, or less metallic elements that surround an open portion (e.g., 359) that permits light to pass through. The embodiments shown and described are nonlimiting.

FIG. 3F depicts an embodiment 360 that includes two metallic rings 362, 366, separated by a non-metallic, non-electrically conductive portion 366. An open interior portion 368 permits incident light to pass through from one side of the embodiment to another side of the embodiment. The embodiment 360 may be used, e.g., in the assembly of FIG. 4 (described below), replacing one or more of the disks 410, 414, 418, 422, 426. When the embodiment 360 is subjected to a varying electromagnetic field, the rings 362, 366 experience eddy current induction heating that can melt thermoplastic material (e.g., thermoplastic lens(es) or another interleaved plastic layer) in physical contact with a portion of the embodiment 350. Other embodiments are contemplated in which a disk may comprise metallic portions and non-metallic portions that surround an open portion (e.g., 368) that permits incident light to pass through. The embodiments shown and described are nonlimiting.

In embodiments, one or more of the embodiments 310-360 in an assembly, such as the lens stack 250 shown in FIG. 2B, is darkened (e.g., blackened), such as by coating the disk or painting the embodiment with a dark paint, which may reduce or prevent reflections of light that may otherwise result in reduction of clarity or contrast of an otherwise refracted image of light that enters the lens stack 250.

As explained above with regard to FIG. 2B and below with regard to FIG. 4, and in further detail below with regard to FIGS. 5-7, as a result of induction heating of the metallic disks the melted plastic, e.g., from the adjacent lens(es) (or other adjacent plastic layer) in physical contact with a metallic disk, may adhere to the metallic disk, enhancing rigidity of the lens stack after induction heating is completed. Additionally, metallic disks with gaps (e.g., thermal expansion gaps, as in metallic disks 310, 320, 330) may permit some of the melted plastic of an adjacent thermoplastic lens to flow through the gap(s) and/or to flow around an outer extent of the metallic disk, and adhere to another adjacent thermoplastic lens at a peripheral portion of the adjacent lens, resulting in fusion of peripheral portions of the adjacent lenses.

In other embodiments (not shown), an assembly that includes lenses interleaved with disks or other embodiments shown in FIGS. 3A-3F, may also be interleaved with layers of a meltable layer (e.g., meltable plastic) that are in physical contact with respective disks or embodiments shown in FIGS. 3A-3F. When subjected to a varying electromagnetic field, the disks or embodiments of FIGS. 3A-3F may experience induction eddy current heating that causes, by thermal conduction with adjacent plastic layer(s), melting of the interleaved meltable plastic, and the melted plastic may adhere to the metallic elements that have been inductively heated. In such embodiments, although the lenses may or may not be fabricated from a thermoplastic material, each of the plastic layers, may also adhere to a corresponding adjacent lens in physical contact with the melted plastic layer. In such embodiments, some or all of the lenses may be fabricated from another optical material, e.g. plastic, glass, etc. that may have a higher melting temperature. However, fusing of the lens stack can occur due to the melting of the interleaved plastic layers and adhesion to adjacent metallic and non-metallic (e.g., lens) surfaces in physical contact with the melted plastic layers.

FIG. 4 illustrates an assembly 400 that includes a fixture 402 ("jig"), which may be, e.g., cylindrical in shape (or a different geometrical shape, e.g., polygonal, elliptical, etc.), the fixture 402 containing a set of lenses interleaved with metallic disks or the embodiments depicted in FIGS. 3A-F, according to an embodiment. The fixture 402 serves to immobilize the set of lenses with respect to one another, and with respect to the interleaved metallic disks. The fixture 402 is typically fabricated from an electrically non-conductive medium. In other embodiments (not shown), the lenses and metallic disks or embodiments depicted in FIGS. 3A-F, may also be interleaved with meltable layers, e.g., meltable plastic.

In the following description, a disk may be replaced by one of the embodiments shown in FIGS. 3A-F. In an embodiment, the assembly 400 may be assembled as follows: A first disk 410 is placed into the fixture 402. Subsequently a first lens 412 is placed into the fixture 402. After each lens 412, 416, 420, 424, is placed into the fixture 402, a corresponding metallic disk (414, 418, 422, 426) whose outside diameter is approximately the outside diameter of the previously placed lens, is placed into the fixture. In an embodiment, some or all of the metallic disks may have the same or similar outside diameter. In an embodiment, lens diameters of the lenses placed in the fixture 402 increase with each successive lens placed into the fixture 402, and diameters of disks (410, 414, 418, 422, 426) increase for each successively placed metallic disk. The largest of the lenses 428 is then placed in the fixture 402.

In some embodiments, the fixture 402 may be made up from several portions that are detachable, e.g., to promote disengagement of the lens stack after induction heating is complete, after which the lenses are fused to each other and adhere to the interleaved metallic disks.

FIG. 5 illustrates an apparatus 500 that may be employed to produce electromagnetic induction heating in a stack of lenses within an assembly of lenses and metallic disks, such as the assembly illustrated in FIG. 4. The apparatus 500 includes a high frequency power source 510, a resonant circuit 512, a control system 514, and an electrical coil 520 that provides an alternating current electromagnetic field within which the fixture/assembly is immersed. In embodiments, typical frequencies used in the induction heating apparatus are 200-300 kHz. In other embodiments, other frequencies may be used in the induction heating process. The chiller 508, controlled by the control system 506, provides cooling to the electrical coil 520, e.g. via an external jacket (not shown) that coaxially surrounds the coil 520. In other embodiments (not shown), the electrical coil 520 may be embedded within the fixture 402 that supports each of the lenses and metallic disks of the assembly of lenses and metallic disks. In other embodiments, the electrical coil 520 may be embedded within a holder (not shown) that surrounds the fixture 402. Whether embedded within the fixture 402, or surrounding the fixture 402, the stack of lenses and metallic disks is surrounded by the electrical coil 520 and the stack of lenses and metallic disks configured to be immersed in an electromagnetic field produced when high frequency, alternating current (AC) is supplied to the electrical coil 520 from the combination of power source 510 and resonant circuit 512.

The electromagnetic field produced by the coil 520 causes electromagnetic induction eddy current heating to occur in each of the metallic disks of the assembly 502 (shown in cross sectional view). Heat from each metallic disk may be transferred through physical contact (via thermal conduction) to the adjacent lens(es), which lenses are typically constructed from a thermoplastic material. Heating of the peripheral portions of the adjacent lens(es) may cause portions of the peripheral portions of the adjacent lens(es) to melt and adhere to the metallic disk to which the adjacent lens is in physical contact. Additionally, some portion of melted plastic from the adjacent lens(es) may pass through the one or more thermal expansion gaps in the metallic disk (see FIG. 3), and/or around a periphery of the adjacent metal disk, and fuse with an adjacent lens on an opposite side of the metallic disk. As a result, the adjacent lenses that are separated by one of the metallic disks adhere to the metallic disk and to a subsequent lens, forming a fused mechanical connection between adjacent lens(es), and between each lens and its adjacent metallic disk(s).

It is to be noted that, for each of the lenses, heating is limited to a peripheral portion of the lens that is in physical contact with the corresponding metallic disk. For example, metallic disk 530 is in physical contact with peripheral portion 542 of lens 540 (shown in cross sectional view). A central portion 544 of the lens 540 has no physical contact with the metallic disk 530. During induction current heating of the metallic disk via the electromagnetic field provided by the coils 520, the peripheral portion 542 of the lens 540 will receive heat, via thermal conduction, from the metallic disk 530 in physical contact with the peripheral portion 542, while the central portion 544 of the lens 540 remains substantially unheated because the central portion 544 is not in physical contact with the metallic disk 530. Therefore, the central portion 544 of the lens 540 will be unaffected (e.g., undistorted) by the heat transferred to the peripheral portion 542. After the induction heating is complete, the central portion 544 will maintain the same optical properties, e.g., refractive properties, as the central portion 544 prior to the induction heating, and will consequently provide the refraction intended for the lens 540 included in the lens stack. Similar considerations apply to each of the lenses of the lens stack: the central portion of each lens is substantially unaffected by the heat transferred to the peripheral portion of the lens that is in physical contact with a corresponding metallic disk. Hence, optical properties of the central portion of each lens are unaffected by the heat transferred to the corresponding peripheral portion, and therefore optical properties of the central portion of each lens remains unchanged from the optical properties of the central portion of the lens prior to induction heating of the lens stack.

FIG. 6 depicts a portion 600 of apparatus 500. Apparatus 600 includes an electrically conductive coil 610 that produces an electromagnetic field 602 employed to fuse a lens stack by induction heating, according to embodiments. The electrically conductive coil 610 carries a high frequency alternating current (indicated by double arrow 612), which in turn produces the electromagnetic field 602. An assembly, such as assembly 400 of FIG. 4, is placed within an interior space defined by the coil 610, and is subject to the electromagnetic field 602. FIG. 6 illustrates a portion of the assembly of FIG. 4, including lenses 620 and 640 and metallic disk (metallic shield) 630 situated between the lenses 620 and 640.

The electromagnetic field 602 causes induction eddy currents 632 and 634 (each depicted with two arrows to indicate alternating direction of eddy current) to flow within the interleaved metallic disk 630. Heat generated by the eddy currents 632, 634 results in heated portions 636, 638 of the metallic disk 630. The heat within the heated portions 636, 638 may be conducted to adjoining thermoplastic lenses 620, 640 that are in physical contact with the metallic disk 630. The metallic disk 630 is open (e.g., "donut-shaped" or near donut-shaped as in 310 of FIG. 3) at a center portion (not shown) of the metallic disk 630, and the metallic disk 630 is in physical contact with the adjoining thermoplastic lenses 620, 640 at their respective peripheral portions. Due to the geometry of the metallic disk 630 (e.g., no metal in the center portion of the disk 630), there is no physical contact between the metallic disk 630 and corresponding center/central portions of the lenses 620, 640. Thermal conduction occurs between the heated portions 636, 638 of the metallic disk 630, and corresponding peripheral portions of the lenses 620, 640 that are in physical contact with the metallic disk 630.

As a result of the heat received by thermal conduction from the metallic disk 630, thermoplastic lenses 620, 640 melt at corresponding lens peripheral portions of the lenses 620, 640, and melted thermoplastic from each of the lenses 620, 640, adheres to the metallic disk 630 at a corresponding side of the metallic disk 630 that is in physical contact with the respective one of the lenses 620, 640. In embodiments, some portion of the melted thermoplastic may flow around the metallic disk 630 and/or may flow through thermal stress relief gaps (e.g., as in FIG. 3, but not shown in FIG. 6) in the disk 630, and that portion of melted thermoplastic may fuse with the peripheral portion of the lens adjacent to the metallic disk 630 on an opposite side of the metallic disk 630.

Thus lens 620, metallic disk 630, and lens 640 are fused together. Referring again to FIGS. 4 and 5, in similar fashion to the description above of fused lenses of FIG. 6, the lens stack 400 is fused by subjecting the lens stack 400 to an electromagnetic field produced in the apparatus 500 to produce an unarticulated lens stack that includes lenses (412, 416, 420, 424, 428) and the interleaved disks (410, 414, 418, 422, 426). (It is noted that in an embodiment, the disk 410 may be non-metallic, and may be placed in front of the fused lens stack and serve to limit light entering the fused lens stack). The fused lens stack is subsequently removable from the external fixture 402 of FIG. 4, and is unarticulated and mechanically stable.

In another embodiment (not shown), any of the embodiments of FIGS. 3A-F may be substituted for any of the interleaved disks 410, 414, 418, 422, 426. When the assembly is subjected to a varying electromagnetic field (similar to FIGS. 5 and 6), induction heating of the metallic portions results, and some of the heat generated may be transferred to adjacent layers in physical contact with the metallic portions. Melting of a meltable material of an adjacent layer in contact with a metallic portion may occur. The melted material may be, e.g., melted thermoplastic of an adjacent lens, or melted plastic of an interleaved (e.g., non-lens) plastic layer, etc. The melted material may adhere to the metallic portion (and may adhere to nearby layers, e.g., if the melted plastic drips through a gap or slit, or around the heated metallic portion), which can result in fusing of the assembly.

FIG. 7 is a flow diagram of a method 700 of making a fused lens stack, according to embodiments. At block 710, a lens (e.g., a thermoplastic lens or other material that may be melted by heat) is placed in a fixture that may be used to align a plurality of interleaved lenses and metallic disks. Proceeding to block 720, a metallic disk is placed in the fixture so that the metallic disk is in physical contact with the previously placed lens at a peripheral portion of the previously placed lens.

Advancing to decision diamond 730, if there are additional lenses to be placed in the fixture, (a total number of lenses is at least two), the method returns to block 710 and a next lens is placed in the fixture. The next lens may contact the previously placed metallic disk at the periphery of the next lens. Proceeding to block 720, another metallic disk is placed in the fixture, contacting the previously placed lens.

Advancing to decision diamond 730, when all lenses have been placed in the fixture, moving to block 740 the assembly of lenses and interleaved metallic disks in the fixture is placed in an electromagnetic induction apparatus. Proceeding to block 750, the lens stack is subject to a varying (e.g. alternating current) electromagnetic field for a predetermined length of time, at a predetermined frequency with a predetermined current flow (electric power), causing induced eddy currents to flow in the metallic disks that result in induction heating of the metallic disks. Heat from the metallic disks flows to peripheral portions of the adjacent lenses in physical contact with the respective disk and causes the peripheral portions of the lenses to melt, while central portions of the lenses are essentially unaffected by the heat and maintain optical characteristics to refract incident light as the lenses refracted prior to the induction heating of the lens stack. The melted portions of each lens adheres to the lens and to the metallic disk with which the lens is in physical contact, and the melted lens material may also optionally flow through gaps in the metallic disks and around the periphery of the metallic disks to fuse with adjacent lenses, forming a fused lens stack. Continuing on to block 760, after the lens stack has cooled sufficiently, the fused lens stack may be removed from the fixture. The method ends at 770.

Figure 8:
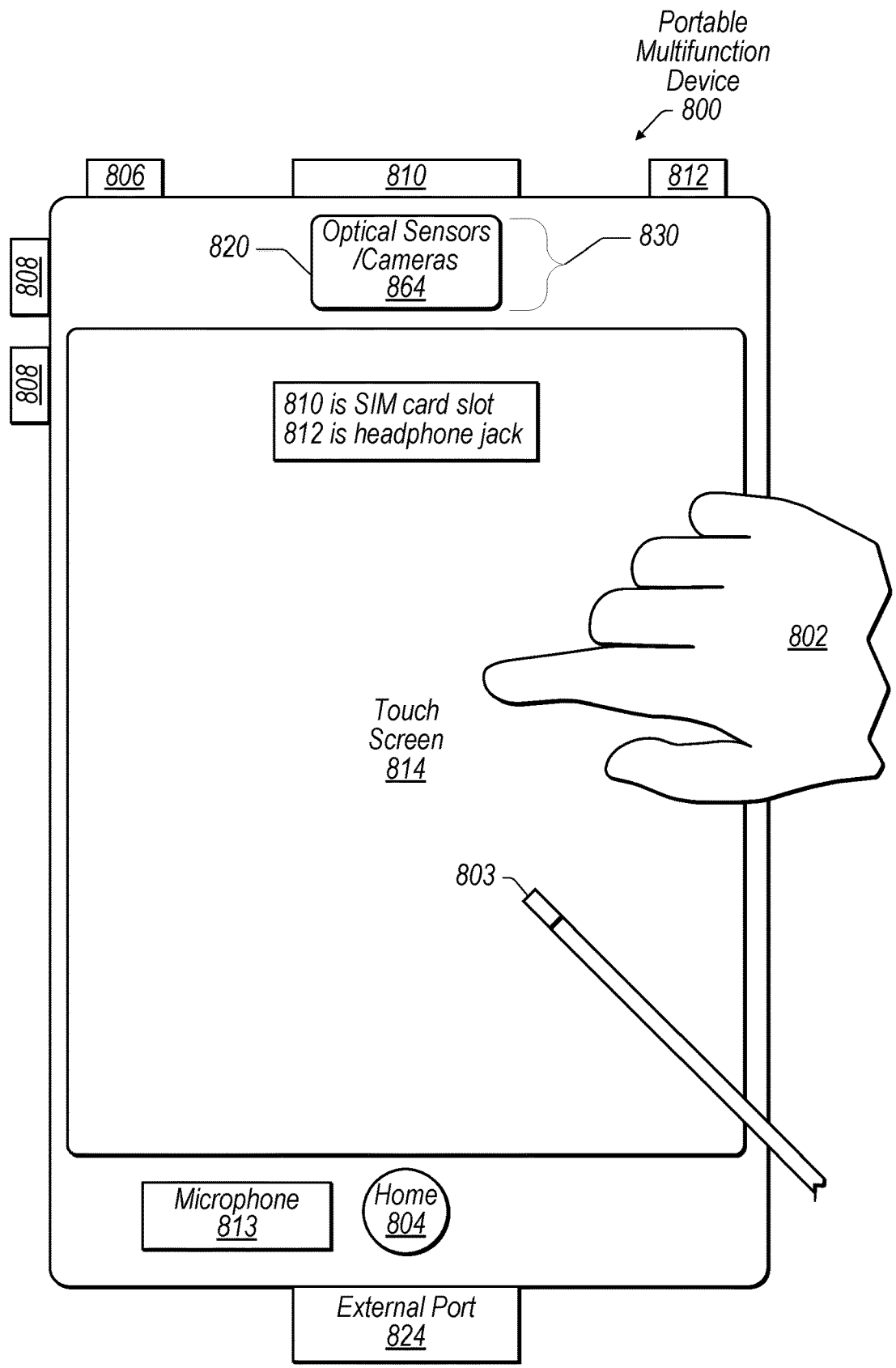
FIG. 8 is a front view illustration of a device that includes a camera employing a lens system as described herein, according to some embodiments.

FIG. 8 illustrates an example portable multifunction device 800 that may include a camera 864 that includes a fused lens stack as described herein, e.g., with reference to FIGS. 1-7. The camera 864 is configured to receive light through a notch 820. The notch 820 is similar in function to the notch 110 depicted in FIG. 1 and as described above, the notch 820 permits light to be received by a camera such as camera 864. Use of the lens stack, constructed as described in FIGS. 1-7, may permit the notch 820 of the device 800 to occupy a smaller area ("less real estate") on a face of the device 800 than if a camera employing a lens stack with a lens barrel (e.g., as shown in FIG. 2A) were to be installed in the device 800 instead of the camera 864. For example, by employing, in the camera, 864 a fused lens stack as described in embodiments herein, a height dimension 830 of the notch 820 may be smaller than a height dimension of a notch needed to accommodate a camera that employs a lens stack with a lens barrel such as the lens barrel 202 of FIG. 2A.

The device 800 may have a touch screen 814. A smaller notch 820 affords additional surface area for the touch screen 814. The touch screen 814 may display one or more graphics within user interface (UI) 800. In the embodiment depicted in FIG. 8, a user may select one or more of the graphics by making a gesture on the graphics, for example, with one or more hands 802 (not drawn to scale in the figure) or one or more styluses 803 (not drawn to scale in the figure).

Device 800 may also include one or more physical buttons, such as "home" 804 or menu button (not shown). The menu button may be used to navigate to any application in a set of applications that may be executed on device 800. Alternatively, in some embodiments, the menu button is implemented as a soft key in a graphical user interface (GUI) displayed on touch screen 814.

In one embodiment, device 800 includes touch screen 814, menu button, push button 806 for powering the device on/off and locking the device, volume adjustment button(s) 808, Subscriber Identity Module (SIM) card slot 810, head set jack 812, and docking/charging external port 824. Push button 806 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 800 also may accept verbal input for activation or deactivation of some functions through microphone 813.

It should be noted that, although many of the examples herein are given with reference to optical sensor(s)/camera(s) 864 (on the front of a device), one or more rear-facing cameras or optical sensors that are pointed opposite from the display may be used instead of, or in addition to, the optical sensor(s)/camera(s) 864 on the front of the device 800.

Figure 9:
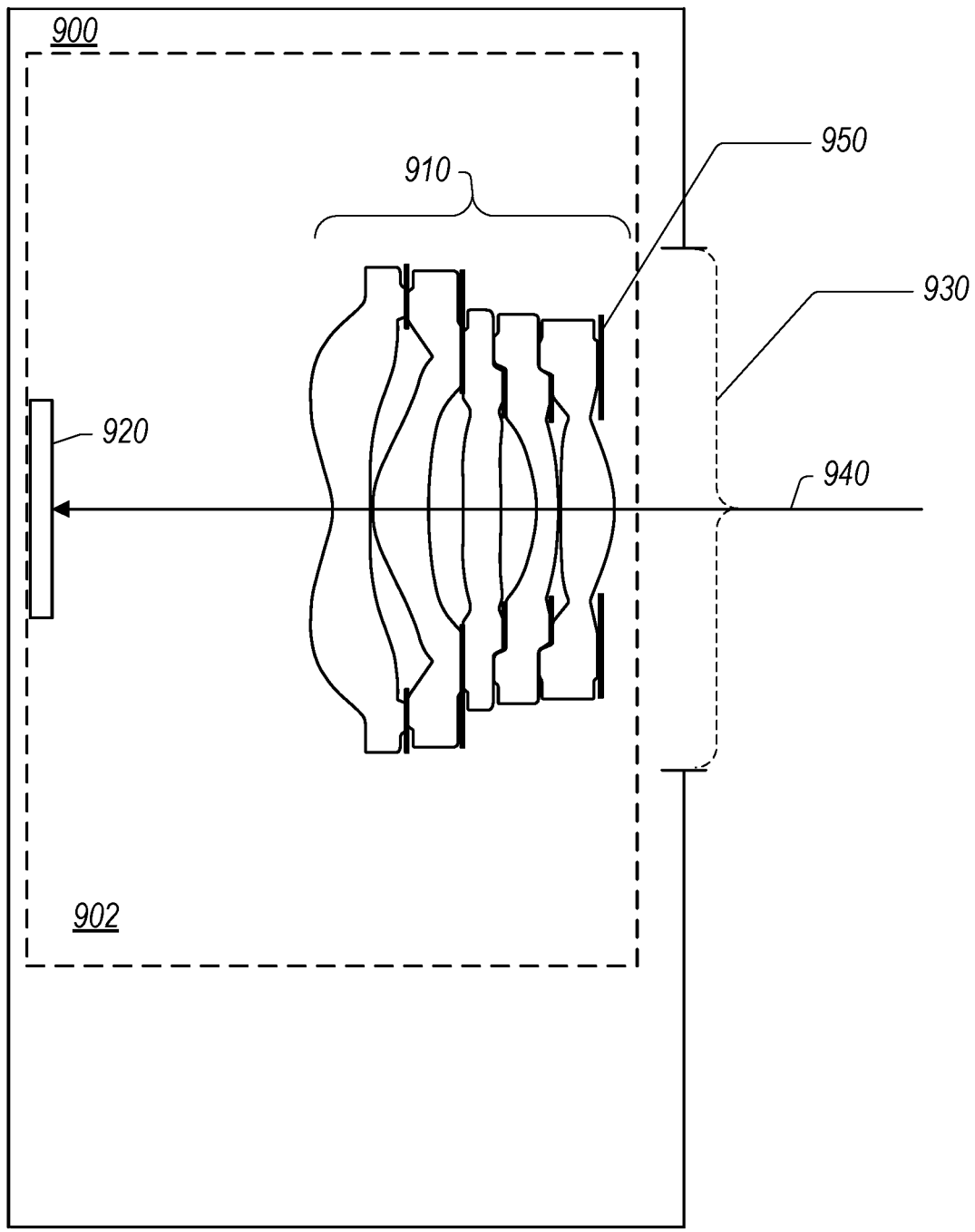
FIG. 9 is a cross-sectional view illustration of a device that includes a camera employing a lens system as described herein, according to some embodiments.

FIG. 9 illustrates a device 900 (e.g., a cellular telephone) that includes an optical system 902 such as a camera, range-finding mechanism, etc. The optical system 902 includes a fused lens stack 910, such as is described in FIGS. 1-7, and an optical sensor 920. Other components of the optical system 902 are omitted for clarity. Incident light 940 may enter the optical system 902 through an opening that spans a distance 930. Because the fused lens stack 910 does not include a lens barrel (shown as 202 in FIG. 2A), the distance 930 is smaller than would be needed to accommodate a lens stack with a lens barrel. The fused lens stack 910 includes metallic disks, and includes (metallic or non-metallic) disk 950 that is opaque and at least partially blocks some light from entering the lens stack 910, e.g., at a large skewed angle with respect to an optic axis, which optic axis is coincident with incident light 940.

Various modifications and changes to the apparatuses described herein may be made as would be obvious to a person skilled in the art having the benefit of this disclosure. The various embodiments described herein are meant to be illustrative and not limiting. The order of the blocks of the method described in FIG. 7 may be changed, and various elements may be added, reordered, combined, omitted, modified, etc. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A lens system, comprising:
    a plurality of lenses assembled coaxially, each lens positioned sequentially along a common optical axis and attached via a melted peripheral portion of the lens to a corresponding disk positioned adjacent to the lens, wherein each lens comprises a central portion that is configured to refract light incident on the lens; and
    the corresponding one or more disks comprise metal, have a center portion that is open and that permits light to pass through the center portion, and are interleaved with the lenses and coaxial with the lenses, wherein each disk is attached to at least one corresponding adjacent lens of the plurality of lenses at a respective side of the disk via at least some of the melted peripheral portion of the corresponding lens.

2. The lens system of claim 1, wherein individual ones of the disks are configured to block stray light reflections from propagating through the lenses of the lens system.

3. The lens system of claim 1, wherein at least one of the disks comprises aluminum, or stainless steel, or SAS metal.

4. The lens system of claim 1, wherein the lenses comprise a thermoplastic material.

5. The lens system of claim 1, wherein one or more of the disks includes one or more thermal stress relief gaps.

6. The lens system of claim 1, wherein each of the disks has a thickness greater than or equal to 20 microns and less than or equal to 50 microns.

7. The lens system of claim 1, wherein each of the disks is configured to heat peripheral portions of a corresponding lens in physical contact with the disk without causing optical distortion of a central portion of the corresponding lens, wherein the central portion of the corresponding lens is configured to refract light.

8. The lens system of claim 1, wherein the lens structure has a height that does not exceed 6 mm.

9. A camera, comprising:
    a plurality of lenses assembled coaxially, each lens positioned sequentially along a common optical axis and attached to a corresponding disk positioned adjacent the lens via a melted peripheral portion of the lens, wherein each lens comprises a central portion that is configured to refract light incident on the lens;
    the corresponding one or more disks comprise metal, have a center portion that is open and that permits light to pass through the center portion, and are interleaved with the lenses and coaxial with the lenses, each disk attached to at least one corresponding adjacent lens of the plurality of lenses at a respective side of the disk via at least some of the melted peripheral portion of the corresponding adjacent lens; and an image sensor configured to receive light refracted from the plurality of lenses.

10. The camera of claim 9, wherein individual ones of the metallic disks are positioned to block stray light reflections from propagating through the lenses.

11. The camera of claim 9, wherein the lenses are mounted in the camera without use of a lens barrel.

12. The camera of claim 9, wherein the lenses do not include one or more interlocking structures configured to interlock with a corresponding structure of another lens.

13. The camera of claim 9, wherein one or more of the metallic disks includes one or more thermal stress relief gaps.

14. A method, comprising:

assembling, coaxially along an optical axis, items comprising:
   a plurality of refractive lenses, each lens having two respective sides, and
   a plurality of metallic disks, each metallic disk having a respective opening that permits light to pass through the opening, wherein individual ones of the disks are interleaved with successive ones of the lenses along the optical axis,
   wherein a peripheral portion of a corresponding side of each lens is in physical contact with a corresponding side of one of the metallic disks; and applying an electromagnetic field to the assembled items that causes inductive heating of the metallic disks, wherein individual ones of the inductively heated metallic disks cause melting of the corresponding peripheral portion of those lenses in physical contact with the inductively heated metallic disk, wherein at least some of the melted peripheral portion of the lenses in physical contact with the metallic disk adhere to the metallic disk.

15. The method of claim 14, wherein the assembling further comprises:

placing each of the lenses and each of the metallic disks into an alignment fixture so that within the alignment fixture, successive lenses are separated from one another by a respective metallic disk.

16. The method of claim 15, further comprising after applying the electromagnetic field, removing from the alignment fixture the assembled items that are adhered.

17. The method of claim 14, wherein the applying the electromagnetic field further comprises applying the electromagnetic field for a predetermined period of time.

18. The method of claim 17, wherein the predetermined period of time is based at least in part on one or more material properties of one or more of the plurality of refractive lenses.

19. The method of claim 17, wherein the predetermined period of time is based at least in part on one or more material properties of one or more of the metallic disks.

20. The method of claim 14, further comprising applying a coating to a surface of at least one of the disks, wherein the coating reduces reflectivity to light incident on the surface of the at least one disk.

* * * * *